US012693401B2

(12) United States Patent
Suzuki et al.

(10) Patent No.: US 12,693,401 B2
(45) Date of Patent: Jul. 28, 2026

(54) TRACKING DEVICE, TRACKING METHOD, AND NON-TRANSITORY COMPUTER READABLE STORAGE MEDIUM

(71) Applicant: DENSO CORPORATION, Kariya-city (JP)

(72) Inventors: Koichiro Suzuki, Shibuya-ku (JP); Chiharu Yamano, Shibuya-ku (JP); Toshiyuki Miyazaki, Kariya-city (JP); Norikazu Ikoma, Minamisaitama-gun (JP)

(73) Assignee: DENSO CORPORATION, Kariya-city (JP)

( * ) Notice: Subject to any disclaimer, the term of this patent is extended or adjusted under 35 U.S.C. 154(b) by 276 days.

(21) Appl. No.: 18/463,967

(22) Filed: Sep. 8, 2023

(65) Prior Publication Data

US 2023/0417895 A1 Dec. 28, 2023

Related U.S. Application Data

(63) Continuation of application No. PCT/JP2022/003482, filed on Jan. 31, 2022.

(30) Foreign Application Priority Data

Mar. 11, 2021 (JP) ................................. 2021-039563

(51) Int. Cl.
  *G01S 13/58* (2006.01)
  *G01S 7/40* (2006.01)
  *G01S 13/66* (2006.01)
(52) U.S. Cl.
  CPC ................ *G01S 13/58* (2013.01); *G01S 7/40* (2013.01); *G01S 13/66* (2013.01)

(58) Field of Classification Search
  None
  See application file for complete search history.

(56) References Cited

U.S. PATENT DOCUMENTS 6,243,037 B1 * 6/2001 Pulford ............... G01S 13/0218
                                                       342/107
6,897,802 B1 * 5/2005 Daniell ............... G01S 13/9027
                                                        342/91

(Continued)

FOREIGN PATENT DOCUMENTS

| JP | 2673311 B2 | 11/1997 |
| JP | 2015-121473 A | 7/2015 |
| WO | 2019/097731 A1 | 5/2019 |

OTHER PUBLICATIONS

P. S. Maybeck and B. D. Smith, "Multiple model tracker based on Gaussian mixture reduction for maneuvering targets in clutter," 2005 7th International Conference on Information Fusion, Philadelphia, PA, USA, 2005, pp. 8 pp.-, doi: 10.1109/ICIF.2005. 1591834. (Year: 2005).*

(Continued)

*Primary Examiner* — Bernarr E Gregory
(74) *Attorney, Agent, or Firm* — Precision Patents, P.C.

(57) ABSTRACT

A target object is tracked based on dimensional information of an observation space including a relative velocity of the target object with respect to a sensing device for observing a reflection wave from the target object. An estimation state is acquired by estimating a state of the target object at a specific time. A reflection source of the reflection wave that gives an observation point observed at the specific time is assumed with respect to the estimation state. A state validity of the estimation state is acquired. The estimation state is updated based on the state validity expressed including a difference between dimensional information of the reflection (Continued)

source projected onto the observation space in the estimation state and the observation information.

14 Claims, 5 Drawing Sheets

(56)                     References Cited

U.S. PATENT DOCUMENTS

| | | | | |
|---|---|---|---|---|
| 10,451,712 | B1 * | 10/2019 | Madhow | G01S 13/723 |
| 2008/0106460 | A1 * | 5/2008 | Kurtz | G01S 13/34 |
| | | | | 342/99 |
| 2009/0312985 | A1 * | 12/2009 | Eliazar | G01S 13/58 |
| | | | | 702/187 |
| 2014/0072233 | A1 * | 3/2014 | Horwood | G01S 13/726 |
| | | | | 382/201 |
| 2014/0324339 | A1 * | 10/2014 | Adam | G01S 13/726 |
| | | | | 701/519 |
| 2019/0391268 | A1 * | 12/2019 | Houts | G01S 7/4808 |
| 2020/0025909 | A1 * | 1/2020 | Liu | G01S 13/726 |
| 2020/0191943 | A1 * | 6/2020 | Wu | G01S 13/726 |
| 2020/0276983 | A1 | 9/2020 | Iida | |

OTHER PUBLICATIONS

Ajorloo, M. Hadavi, M. M. Nayebi and M. H. Bastani, "Statistical modeling of consecutive range profiles for radar target recognition," 2013 14th International Radar Symposium (IRS), Dresden, Germany, 2013, pp. 608-613. (Year: 2013).*

K. Granstrom et.al., "Extended object tracking: Introduction, overview, and applications," Journal of Advances in Information Fusion, vol. 12, No. 2, 2017.

* cited by examiner

TRACKING DEVICE, TRACKING METHOD, AND NON-TRANSITORY COMPUTER READABLE STORAGE MEDIUM

CROSS REFERENCE TO RELATED APPLICATIONS

The present application is a continuation application of International Patent Application No. PCT/JP2022/003482 filed on Jan. 31, 2022, which designated the U.S. and claims the benefit of priority from Japanese Patent Application No. 2021-039563 filed on Mar. 11, 2021. The entire disclosures of all of the above applications are incorporated herein by reference.

TECHNICAL FIELD

The present disclosure relates to a tracking technology for tracking target objects.

BACKGROUND

A tracking technology for tracking a target based on observation information of a sensing device that observes reflected waves from the target object is widely known. As a type of tracking technology, the so-called extended object tracking (EOT), which estimates the target object state such as a position, a speed, and a shape in time series from multiple observation points where the target object is observed, is known as a conceivable technique.

SUMMARY

According to an example, a target object is tracked based on dimensional information of an observation space including a relative velocity of the target object with respect to a sensing device for observing a reflection wave from the target object. An estimation state is acquired by estimating a state of the target object at a specific time. A reflection source of the reflection wave that gives an observation point observed at the specific time is assumed with respect to the estimation state. A state validity of the estimation state is acquired. The estimation state is updated based on the state validity expressed including a difference between dimensional information of the reflection source projected onto the observation space in the estimation state and the observation information.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
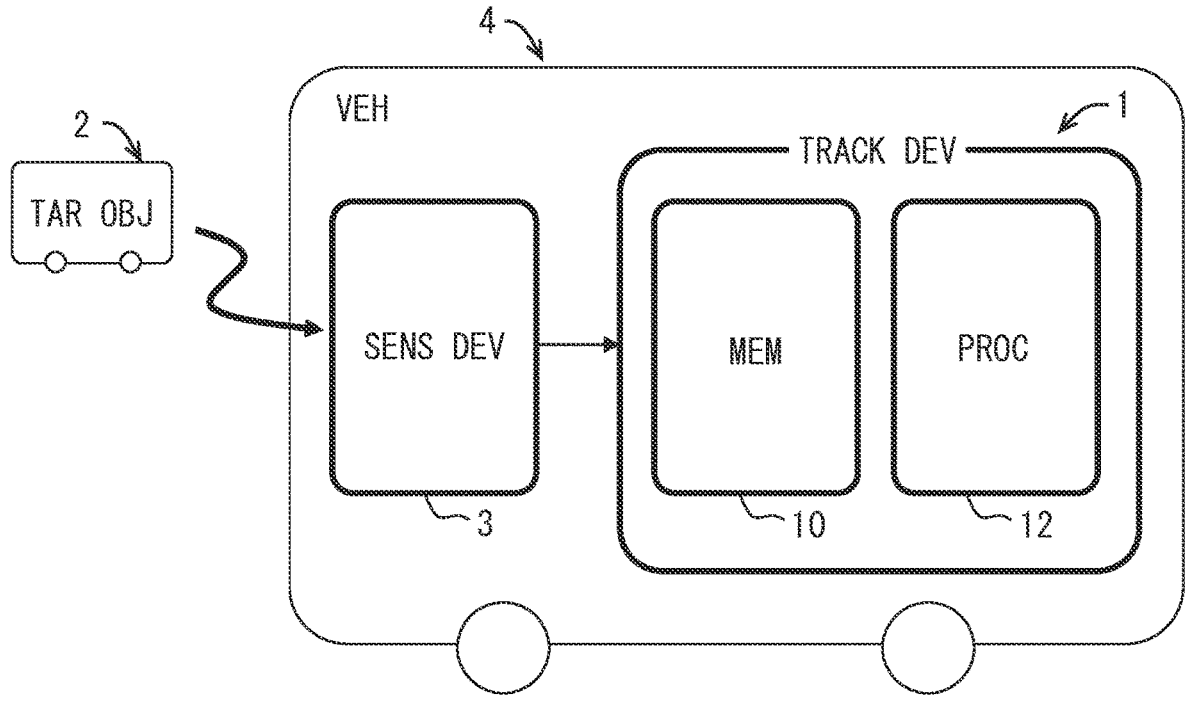
FIG. 1 is a block diagram showing the overall configuration of a tracking device according to one embodiment.

In one method of EOT, the reflection source of the reflected wave that gives the observation point is specified, and then, the validity of the state of the target object is obtained based on the specification result. However, in this method, observation information of observation points is limited to two-dimensional position information. Therefore, for example, when the observation information includes the relative velocity of a target object with respect to a sensing device such as a radar, it is necessary to improve the method in order to ensure the tracking accuracy by applying this method since the calculation load (i.e., the calculation cost) increases.

Also, in one method of EOT, one reflection source of the reflected wave that gives the observation point is specified, and then, the validity of the state of the target object is acquired based on the specification result. However, with this method, it is difficult to narrow down the sources to a single reflection source, so the accuracy of narrowing down may affect the accuracy of tracking. Therefore, in another method of EOT, the target object state is estimated by a time-series filter without specifying the reflection source that gives the observation point. However, this method increases the calculation load in the process of estimating the target object state in time series.

An object of the present embodiments is to provide a tracking device that achieves both securing of tracking accuracy and reduction of calculation load. Another object of the present disclosure is to provide a tracking method that achieves both securing of tracking accuracy and reduction of calculation load. Still another object of the present disclosure is to provide a tracking program that achieves both securing of tracking accuracy and reduction of calculation load.

Hereinafter, technical means of the present embodiments for solving the difficulties will be described.

According to the first aspect of the present embodiments, a tracking device that tracks a target object based on dimensional information of an observation space including a relative velocity of the target object with respect to a sensing device as observation information of the sensing device that observes a reflection wave from the target object, includes:

an estimation unit that acquires an estimation state by estimating a state of the target object at a specific time;

an assumption unit that assumes a reflection source of the reflection wave that gives an observation point observed at the specific time with respect to the estimation state;

a validity unit that acquires a state validity, which is a validity of the estimation state; and an update unit that updates the estimation state based on the state validity expressed including a difference between the dimensional information of the reflection source projected onto the observation space in the estimation state and the observation information.

According to a second aspect of the present embodiments, a method of tracking a target object based on dimensional information of an observation space including a relative velocity of the target object with respect to a sensing device as observation information of the sensing device that observes a reflection wave from the target object, the method being executed by a processor, includes:

an estimation step for acquiring an estimation state by estimating a state of the target object at a specific time;

an assumption step for assuming a reflection source of the reflection wave that gives an observation point observed at the specific time with respect to the estimation state;

a validity step for acquiring a state validity, which is a validity of the estimation state; and an update step for updating the estimation state based on the state validity expressed including a difference between the dimensional information of the reflection source projected onto the observation space in the estimation state and the observation information.

According to a third aspect of the present embodiments, a tracking program includes instructions causing a processor to execute tracking a target object based on dimensional information of an observation space including a relative velocity of the target object with respect to a sensing device as observation information of the sensing device that observes a reflection wave from the target object.

The instructions includes:

an estimation step for acquiring an estimation state by estimating a state of the target object at a specific time;

an assumption step for assuming a reflection source of the reflection wave that gives an observation point observed at the specific time with respect to the estimation state;

a validity step for acquiring a state validity, which is a validity of the estimation state; and an update step for updating the estimation state based on the state validity expressed including a difference between the dimensional information of the reflection source projected onto the observation space in the estimation state and the observation information.

According to these first to third aspects, the reflection source of the reflection wave giving the observation point observed at the specific time is assumed with respect to the estimation state of the target object at the specific time. Therefore, the estimation state is updated according to the state validity, which is the validity of the estimation state, and expressed including the difference between the dimensional information of the reflection source projected onto the observation space in the estimation state and the observation information in the observation space.

In such first to third aspects, the dimensional information of the reflection source including the relative velocity of the target object in the observation space is compared with the observation information of the same dimension, so that the estimation state is updated using the state validity with high accuracy reflecting the result of the difference comparison. Therefore, it is possible to achieve both securing the tracking accuracy and reducing the calculation load.

According to a fourth aspect of the present embodiments, a tracking device that tracks a target object based on observation information from a sensing device for observing a reflection wave from the target object, includes:

an estimation unit that acquires an estimation state by estimating a state of the target object at a specific time;

an assumption unit that assumes a plurality of reflection sources of the reflection wave that give an observation point observed at the specific time with respect to the estimation state;

a validity unit that acquires a state validity, which is a validity of the estimation state, based on an occurrence rate of each reflection source in the estimation state and an assumption validity which is a validity of each reflection source in the estimation state; and an update unit that updates the estimation state based on the state validity.

According to a fifth aspect of the present embodiments, a method of tracking a target object based on dimensional information of an observation space including a relative velocity of the target object with respect to a sensing device as observation information of the sensing device that observes a reflection wave from the target object, the method being executed by a processor, includes:

an estimation step for acquiring an estimation state by estimating a state of the target object at a specific time;

an assumption step for assuming a plurality of reflection sources of the reflection wave that give an observation point observed at the specific time with respect to the estimation state;

a validity step for acquiring a state validity, which is a validity of the estimation state, based on an occurrence rate of each reflection source in the estimation state and an assumption validity which is a validity of each reflection source in the estimation state; and an update step for updating the estimation state based on the state validity.

According to a sixth aspect of the present embodiments, a tracking program includes instructions causing a processor to execute tracking a target object based on dimensional information of an observation space including a relative velocity of the target object with respect to a sensing device as observation information of the sensing device that observes a reflection wave from the target object.

The instructions includes:

an estimation step for acquiring an estimation state by estimating a state of the target object at a specific time;

an assumption step for assuming a plurality of reflection sources of the reflection wave that give an observation point observed at the specific time with respect to the estimation state;

a validity step for acquiring a state validity, which is a validity of the estimation state, based on an occurrence rate of each reflection source in the estimation state and an assumption validity which is a validity of each reflection source in the estimation state; and an update step for updating the estimation state based on the state validity.

According to these fourth to sixth aspects, the plurality of reflection sources of the reflection wave giving the observation point observed at the specific time is assumed with respect to the estimation state of the target object at the specific time. Therefore, the estimation state is updated at the specific time using the state validity, which is the validity of the estimation state, and acquired based on the occurrence rate of each reflection source in the estimation state and the assumption validity, which is the validity of each reflection source in the estimation state.

Thus, in the fourth to sixth aspects, the state validity can be acquired accurately by reflecting the occurrence rate and the assumption validity for each of the plurality of assumed reflection sources. Therefore, by updating the estimation state using the accurate state validity, it is possible to ensure the tracking accuracy. Moreover, since all of the reflection source assumption, validity acquisition, and state update are processes related to a specific time, it is possible to reduce the calculation load while ensuring the tracking accuracy.

Hereinafter, an embodiment will be described with reference to the drawings.

As shown in FIG. 1, a tracking device 1 according to one embodiment implements EOT for executing a recognizing and tracking process for a wide target object 2 from at least one observation point where the target object 2 is observed. For this purpose, the tracking device 1 is mounted on the vehicle 4 together with the sensing device 3. The sensing device 3 is, for example, a millimeter-wave radar or LIDAR (Light Detection and Ranging/Laser Imaging Detection and Ranging) that can observe a group of reflection sources by sensing the target object 2. Here, especially as the sensing device 3, a millimeter wave radar may be preferable. The sensing device 3 repeats sensing of the target object 2 and observation of the group of reflection sources at predetermined time intervals. Therefore, in the tracking device 1, the reflection source group observed by the sensing device 3 at the specific time k is recognized as at least one observation point for the target object 2 at the same time k.

The tracking device 1 is connected to the sensing device 3 via at least one of, for example, a LAN (Local Area Network), a wire harness, an internal bus, and the like. The tracking device 1 is a special purpose computer including at least one memory 10 and at least one processor 12. The memory 10 is at least one type of non-transitory tangible storage medium, such as a semiconductor memory, a magnetic storage medium, and an optical storage medium, for non-transitory storing or memorizing computer readable programs and data. The processor 12 includes, as a core, at least one type of, for example, a CPU (Central Processing Unit), a GPU (Graphics Processing Unit), an RISC (Reduced Instruction Set Computer) CPU, and the like.

Figure 2:
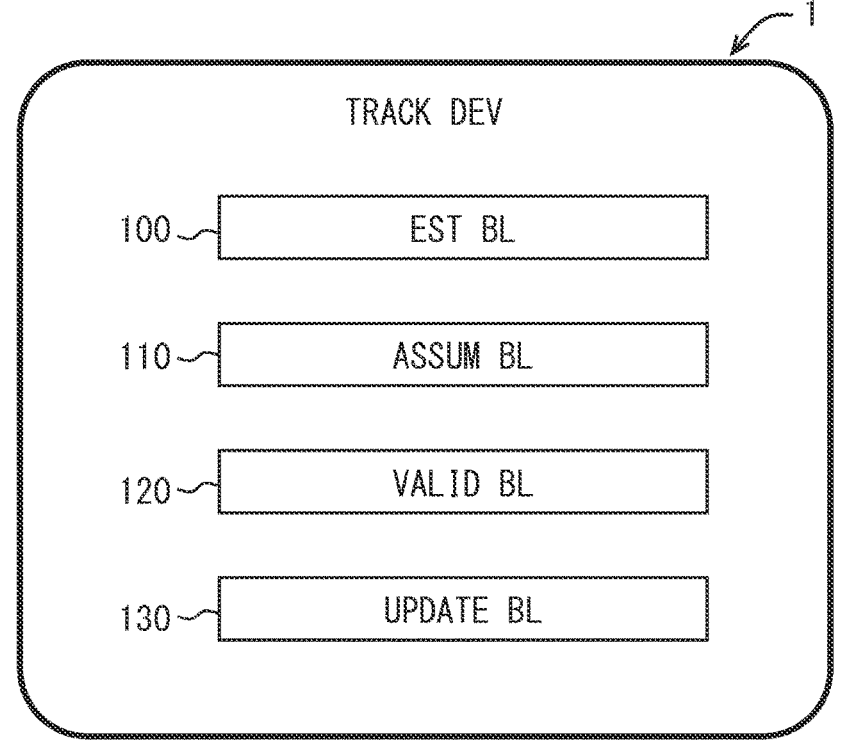
FIG. 2 is a block diagram showing the detailed configuration of a tracking device according to one embodiment.

The processor 12 executes a plurality of instructions included in a tracking program stored in the memory 10. Thereby, the tracking device 1 provides a plurality of functional blocks for tracking the target object 2. In this way, in the tracking device 1, the tracking program stored in the memory 10 causes the processor 12 to execute a plurality of instructions to track the target object 2, thereby providing a plurality of functional blocks. As shown in FIG. 2, the functional blocks provided by the tracking device 1 include an estimation block 100, an assumption block 110, a validity block 120 and an update block 130.

The flow of the tracking method in which the tracking device 1 tracks the target object 2 in cooperation with the function blocks 100, 120, and 140 will now be described with reference to FIG. 3. This flow is executed each time the tracking cycle from the previous past time k−1 to the current specific time k is repeated. In this flow, "S" means a plurality of steps of this flow that are executed by a plurality of instructions included in the tracking program.

Figure 4:
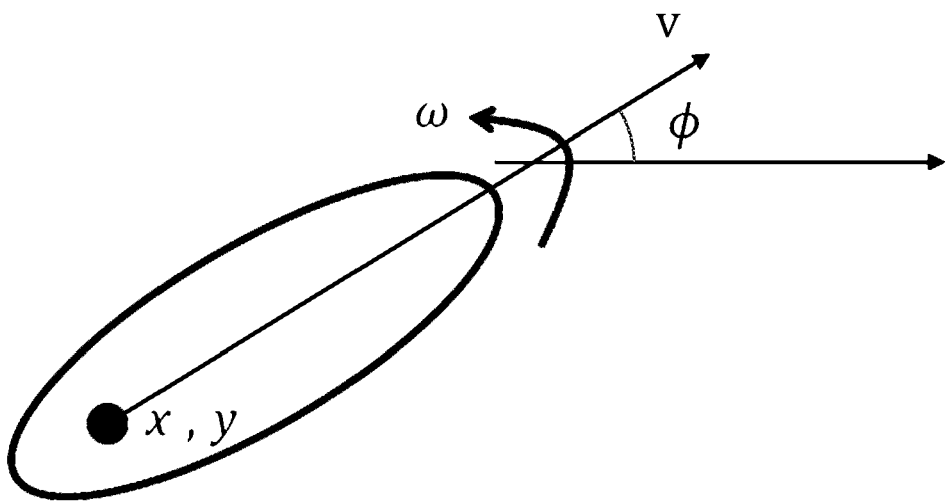
FIG. 4 is a schematic diagram for explaining an estimation block according to one embodiment.
Figure 5:
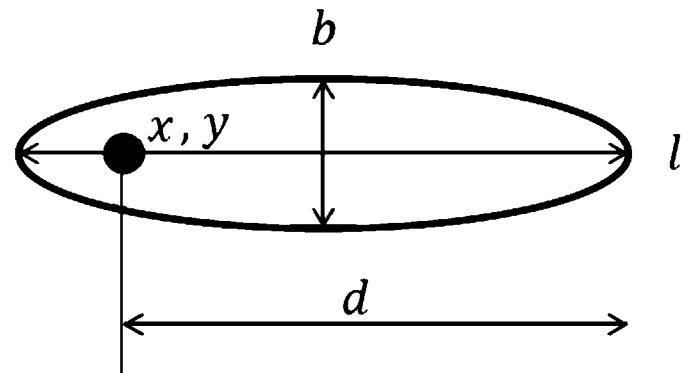
FIG. 5 is a schematic diagram for explaining an estimation block according to one embodiment.

In S100 of the tracking method, the estimation block 100 estimates the state of the target object 2 at the specific time k. As a premise for this estimation, if the target object 2 is another vehicle (see FIG. 1) around the vehicle 4, then the estimation state of the target object 2 at the specific time k is defined by Expression 1 based on a circular motion model (i.e., Constant Turn Rate and Velocity model) that schematizes the target object 2 as an ellipse, as shown in FIGS. 4 and 5. In Expression 1, x and y are the lateral and longitudinal positions of the center of the rear wheel on the target object 2 in rectangular coordinates, respectively. In Expression 1, v, φ, and ω are the velocity, the azimuth, and the yaw rate of the target object 2, respectively. In Expression 1, l, b, and d are the major axis length and the minor axis length of the ellipse that schematically represents the target object 2 in the circular motion model, and the ratio between the distance from the front end of the target object 2 to the center of the rear wheel and the major axis length, respectively.

$$\xi = [x, y, v, \phi, \omega, l, b, d]^T \qquad \text{[Expression 1]}$$

On the other hand, the index number that identifies each independent observation point of the target object 2 at the specific time k is defined as m, and, using the number of observation points defined as M that is the total number of these observation points, the index number m is defined by Expression 2. Under this definition, each observation information $z^m$ at the observation point group {z} of the target object 2 at the specific time k is defined by Expressions 2 and 3. In Expression 3, r is the distance from the sensing device 3 to the observation point. In Expression 4, dr is the relative velocity of the observation point with respect to the sensing device 3 and can also be defined as the Doppler velocity. In Expression 3, u is the azimuth of the observation point with respect to sensing device 3 and is given by Expression 4. Thus, the observation information $z^m$ is given as three-dimensional information of the observation space, including the distance r, the relative velocity dr, and the azimuth u. In the following, for convenience of explanation, each observation point constituting the observation point group {z} and specified by the observation information $z^m$ will also be referred to as the observation point $z^m$ (here, a case where m is the value of the index number according to the need for explanation is included).

$$\{z\} = \{z^1, z^2, \ldots, z^M\} \qquad \text{[Expression 2]}$$

$$Z^m = [r, dr, u]^T \qquad \text{[Expression 3]}$$

$$u = \frac{y}{r} \qquad \text{[Expression 4]}$$

Based on Expressions 1 to 4, the estimation block 100 estimates the state of the target object 2 at the specific time k. Specifically, the estimation block 100 acquires the estimation state of the target object 2 at the specific time k according to Expressions 5 to 8 conforming to the Gaussian mixture model based on the state $\xi_{k-1}$ of the target object 2 at the past time k−1 with respect to the specific time k. In Expressions 6 and 7, T is the tracking period that is the update cycle of the state ξ. In Expression 8, $\sigma_v$ and $\sigma_\omega$ are standard deviations of acceleration and angular acceleration mixed as noise for a constant velocity and yaw rate, respectively. Note that the estimation state $\xi_k$ at the specific time k is hereinafter simply referred to as the estimation state ξ for convenience of explanation.

$$\xi_k = f(\xi_{k-1|k-1}) + Gv_{k-1} \qquad \text{[Expression 5]}$$

$$f(\xi_{k-1|k-1}) = \begin{bmatrix} x + \left(\frac{2v}{\omega}\right)\sin\left(\frac{\omega T}{2}\right)\cos\left(\phi + \frac{\omega T}{2}\right) \\ y + \left(\frac{2v}{\omega}\right)\sin\left(\frac{\omega T}{2}\right)\sin\left(\phi + \frac{\omega T}{2}\right) \\ v \\ \phi + \omega T \\ \omega \\ l \\ b \\ d \end{bmatrix} \qquad \text{[Expression 6]}$$

-continued $$G = \begin{bmatrix} 0 & 0 \\ 0 & 0 \\ T & 0 \\ 0 & 0 \\ 0 & \dfrac{T^2}{2} \\ 0 & T \\ 0 & 0 \\ 0 & 0 \end{bmatrix}$$  [Expression 7]

$$v_{k-1} = [v_{vk-1}, \ v_{\omega k-1}]^T \sim N\left(0, \ \mathrm{diag}\left(\left[\sigma_v^2, \ \sigma_\omega^2\right]\right)\right)$$  [Expression 8]

The estimation block 100 further acquires the prior distribution $p(\xi)$ of the target object 2 at the specific time k based on the estimation state of the specific time k which is estimated. Specifically, i is defined as an index number that identifies a sampling point in an Extended Kalman Filter (EKF), and the index number i is defined by Expression 9 using the number of particles I, which is the total number of sampling points. Under this definition, the estimation block 100 calculates the prior distribution $p(\xi)$ of the target object 2 estimated at the specific time k as a whole using Expressions 10-13. N in Expression 10 is a distribution function representing a Gaussian distribution. In Expressions 10 and 11, $\lambda^i$ is a weighting function that takes a value of 1 by summing all sampling points. In Expression 12, f is the transition function defined by Expression 6. In Expression 13, G is the noise model matrix given by Expression 7. In Expression 13, a and aw are standard deviations of acceleration and angular acceleration, respectively, mixed as noise as in Expression 8.

$$i = 1 \sim I$$  [Expression 9]

$$p(\xi) = \Sigma\lambda^i N(\overline{\xi}^i, M^i)$$  [Expression 10]

$$\Sigma\|^i = 1$$  [Expression 11]

$$\overline{\xi}^i = f\left(\xi_{k-1|k-1}^i\right)$$  [Expression 12]

$$M^i = G \cdot \mathrm{diag}\left(\left[\sigma_v^2, \ \sigma_\omega^2\right]\right) \cdot G^T$$  [Expression 13]

Figure 3:
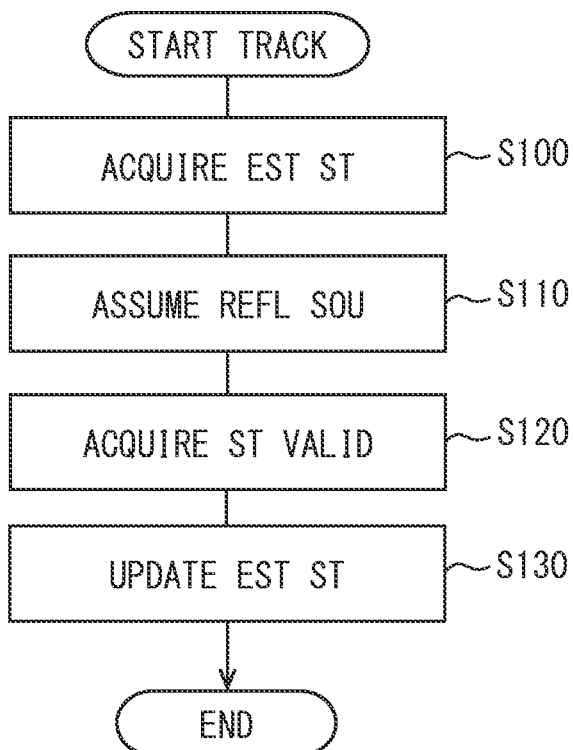
FIG. 3 is a flowchart illustrating a tracking method according to one embodiment.
Figure 6:
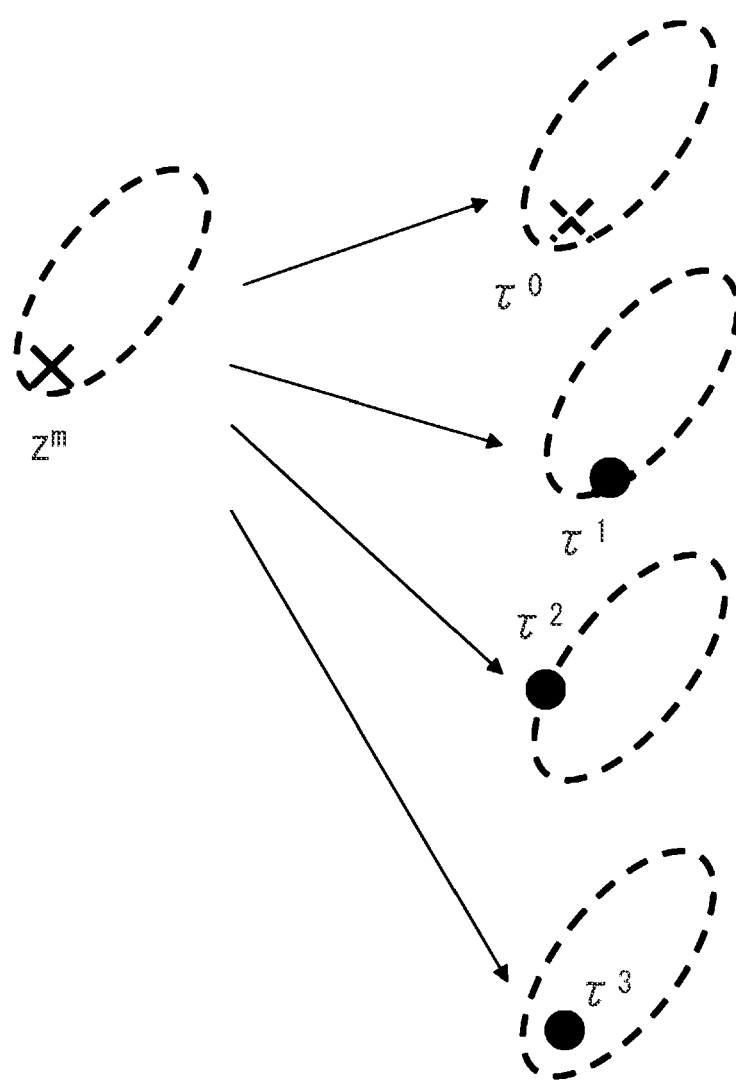
FIG. 6 is a schematic diagram for explaining an assumption block according to one embodiment.

As shown in FIG. 3, in S110 of the tracking method, the assumption block 110 assumes the reflection source of the reflection wave giving the observation point zm observed at the specific time k with respect to the estimation state $\xi$ at the specific time k. Specifically, the assumption block 110 assumes the clutter reflection source $\tau 0$, the closest reflection source $\tau 1$, the symmetrical reflection source $\tau 2$, and the internal reflection source $\tau 3$ as a plurality of reflection sources (i.e., a plurality of candidate reflection sources) corresponding to observation point zm as shown in FIG. 6. Specifically, the clutter reflection $\tau 0$ is assumed to be a reflection source due to clutter. As used herein, the terms "assume" or "assumption" refer to processor-executed operations in which the system identifies or computationally determines one or more candidate reflection sources (e.g., $\tau 0$, $\tau 1$, $\tau 2$, $\tau 3$) based on the estimation state and observation information.

Figure 7:
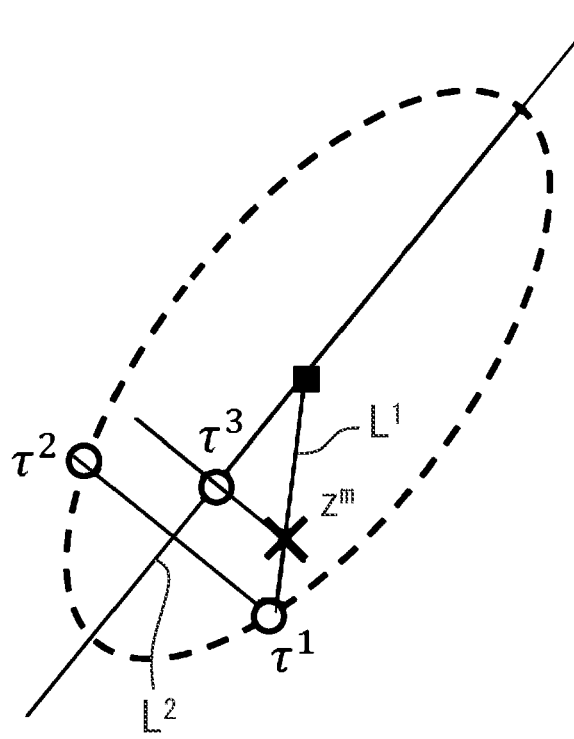
FIG. 7 is a schematic diagram for explaining an assumption block according to one embodiment.

As shown in FIG. 7, the closest reflection source $\tau^1$ is assumed as the reflection source at the closest position on the outer periphery of the estimation state $\xi$. Here, the closest reflection source $\tau^1$ is defined by the two-dimensional coordinates of the points of intersection on the circumference of the ellipse as the outer periphery of the estimation state $\xi$ that intersects with the straight line $L^1$ connecting the elliptical center $e_0$ of the ellipse that schematically represents the target object 2 in the circular motion model and the observation point $z^m$. The closest reflection source $\tau^1$ is then algebraically given by Expressions 14-19. In Expression 15, $r_\varphi$ is a two-dimensional rotation matrix that gives a rotation of the azimuth angle $\varphi$ [rad] with respect to the distance r of the observation point $z^m$. In Expression 17, u is the azimuth of the observation point $z^m$ given by Expression 4.

$$\tau^1 = \frac{1}{k}(z_p - e_0) + e_0$$  [Expression 14]

$$k^2 = (z_p - e_0)^T r_\phi \Lambda^{-2} r_\phi^T (z_p - e_0)$$  [Expression 15]

$$\Lambda = \mathrm{diag}\left(\left[\frac{l}{2}, \frac{b}{2}\right]\right)$$  [Expression 16]

$$z_p = \left[r \cdot \mathrm{sqrt}(1 - u^2), \ r \cdot u\right]^T$$  [Expression 17]

$$e_0 = [x, \ y]^T + (d - 0, \ 5)r_\phi u_0$$  [Expression 18]

$$u_0 = [1, \ 0]^T$$  [Expression 19]

As shown in FIG. 7, the symmetrical reflection source $\tau^2$ is assumed as the reflection source at the position symmetrical to the closest position of the closest reflection source $\tau^1$ on the outer periphery of the estimation state $\xi$. Here, the symmetric reflection source $\tau^2$ is defined in the two-dimensional coordinates of the point of symmetry with respect to the closest position of the closest reflection source $\tau^1$ on the elliptical circumference of the ellipse that is the outer periphery of the estimation state using the elliptical long axis $L^2$ of the ellipse that schematically represents the target object 2 in the circular motion model as the symmetric axis. The symmetric reflection source $\tau^2$ is then algebraically given by Expressions 20, 21, 15 and 17 to 19.

$$\tau^2 = \frac{1}{k} r_\phi J r_\phi^T (z_p - e_0) + e_0$$  [Expression 20]

$$J = \mathrm{diag}([1, \ -1])$$  [Expression 21]

As shown in FIG. 7, the internal reflection source $\tau^3$ is assumed as the reflection source within the outer periphery of the estimation state $\xi$ when the observation point $z^m$ exists within the outer periphery of the estimation state $\xi$. Here, the internal reflection source $\tau^3$ is defined as the two-dimensional coordinates of the projection point where the observation point $z^m$ is projected perpendicularly to the elliptical long axis $L^2$ of the ellipse that schematically represents the target object 2 in the circular motion model. The internal reflection source $\tau^3$ is then algebraically given by Expressions 22, 23 and 17-19.

$$\tau^3 = r_\phi P_x r_\phi^T (z_p - e_0) + e_0$$  [Expression 22]

$$P_x = \begin{bmatrix} 1 & 0 \\ 0 & 0 \end{bmatrix}$$  [Expression 23]

As shown in FIG. 3, in S120 of the tracking method, the validity block 120 acquires the state validity $p(\{z\}|\xi)$, which is the validity of the estimation state at the specific time k. Specifically, the validity block 120 acquires the state validity $p(\{z\}|\xi)$ at the specific time k using Expressions 24-27. That is, the validity block 120 acquires the state validity $p(\{z\}|\xi)$ from the occurrence rate $p(\tau^j|\xi)$ for each reflection source in the estimation state $\xi$ and the assumption validity $p(z^m|\xi, \tau^j)$ which is the validity for each reflection source in the estimation state $\xi$. In Expressions 25 to 27, J is the numerical number that identifies the reflection source, that is, the index number (that is, 0, 1, 2, 3) of each sign attached to the clutter reflection source $\tau^0$, the closest reflection source $\tau^1$, the symmetrical reflection source $\tau^2$, and the internal reflection source $\tau^3$. In the following description, the clutter reflection source $\tau^0$, the closest reflection source $\tau^1$, the symmetrical reflection source $\tau^2$, and the internal reflection source $\tau^3$ are collectively referred to as the reflection source $\tau^j$. Also, j is the index number (that is, 1, 2, 3) that identifies the reflection sources other than the clutter reflection source $\tau^0$ (that is, the closest reflection source $\tau^1$, the symmetrical reflection source $\tau^2$, and the internal reflection source $\tau^3$), and the reflection sources other than the clutter reflection source TO are collectively referred to as reflection sources $\tau^j$.

$$p(\{z\}|\xi)=\Pi p(z^m|\xi) \qquad \text{[Expression 24]}$$

$$p(z^m|\xi)=\Sigma w^j p(z^m|\xi,\tau^j) \qquad \text{[Expression 25]}$$

$$w^j=p(\tau^j|\xi)/\Sigma p(\tau^j|\xi) \qquad \text{[Expression 26]}$$

$$\Sigma w^j=1 \qquad \text{[Expression 27]}$$

The validity block 120 sets the occurrence rate $p(\tau^0|\xi)$ of the clutter reflection source $\tau^0$ assumed by the assumption block 110 of S110 according to Expression 28. The random variable $\alpha_c$ less than 1 in Expression 28 is set to a smaller numerical value as the reflection intensity of the reflection wave at the observation point $z^m$ corresponding to the clutter reflection source $\tau^0$ increases. That is, the validity block 120 sets the occurrence rate $p(\tau^0|\xi)$ of the clutter reflection source $\tau^0$ to be lower as the reflection intensity of the reflection wave at the observation point $z^m$ is higher.

$$p(\tau^0|\xi)=a_c \qquad \text{[Expression 28]}$$

The validity block 120 sets the occurrence rate $p(\tau^1|\xi)$ of the closest reflection source $\tau^1$ assumed by the assumption block 110 of S110 by Expressions 29-31. The random variable $\alpha_e$ less than 1 in Expressions 29 and 30 is set to a higher numerical value as the reflection intensity of the reflection wave at the observation point $z^m$ corresponding to the closest reflection source $\tau^1$ increases. That is, the validity block 120 sets the occurrence rate $p(\tau^1|\xi)$ of the closest reflection source $\tau^1$ to be higher as the reflection intensity of the reflection wave at the observation point $z^m$ is higher.

$$p(\tau^1|\xi)=\alpha_t \cdot \alpha_e \cdot P^{11} \qquad \text{[Expression 29]}$$

$$p(\tau^1|\xi)=\alpha_t \cdot \alpha_e \cdot P^{12} \qquad \text{[Expression 30]}$$

$$\alpha_t=1-\alpha_c \qquad \text{[Expression 31]}$$

Figure 8:
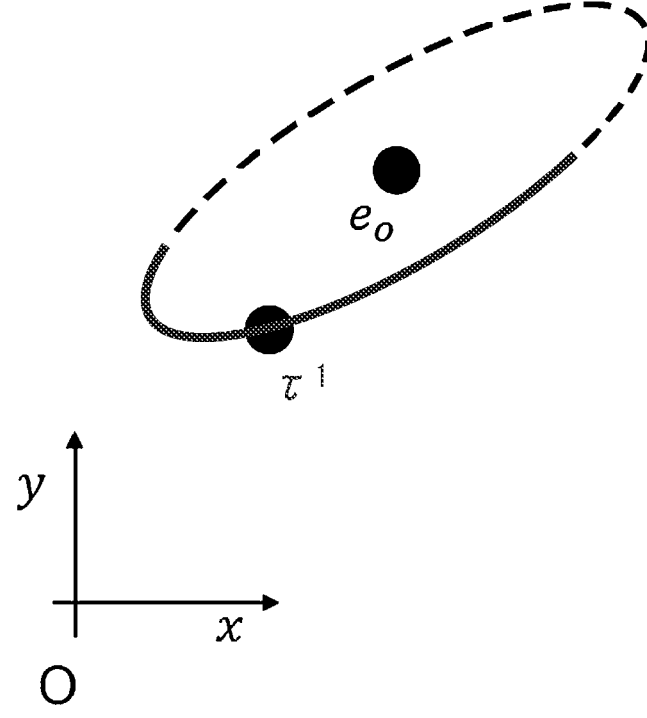
FIG. 8 is a schematic diagram for explaining a validity block according to one embodiment.

In the validity block 120, when the closest reflection source $\tau^1$ is assumed, by the assumption block 110 at S110, on the front side which is the side of the origin point O of the sensing device 3 on the outer periphery of the estimation state $\xi$ shown in FIG. 8 (i.e., the elliptical arc part shown as the thick solid line in FIG. 8), the occurrence rate $p(\tau^1|\xi)$ is set by Expression 29. On the other hand, in the validity block 120, when the closest reflection source $\tau^1$ is assumed, by the assumption block 110 at S110, on the back side which is a side opposite to the origin point O of the sensing device 3 on the outer periphery of the estimation state $\xi$ (i.e., the elliptical arc part shown as the thin dashed line in FIG. 8), the occurrence rate $p(\tau^1|\xi)$ is set by Expression 30. Here, the random variable $P^{11}$ when setting the occurrence rate $p(\tau^1|\xi)$ on the front side is set to be a larger value than the random variable $P^{12}$ when setting the occurrence rate $p(\tau^1|\xi)$ on the back side, and the sum of the random variables in both cases is 1. That is, the validity block 120 sets the occurrence rate $p(\tau^1|\xi)$ in the case assumed on the front side higher than the occurrence rate $p(\tau^1|\xi)$ in the case assumed on the back side.

The validity block 120 sets the occurrence rate $p(\tau^2|\xi)$ of the symmetrical reflection source $\tau^2$ assumed by the assumption block 110 at S110 according to Expressions 32, 33 and 31. The random variable $\alpha_e$ in Expressions 32 and 33 is set to a higher numerical value as the reflection intensity of the reflection wave at the observation point $z^m$ corresponding to the symmetrical reflection source $\tau^2$ increases. That is, the validity block 120 sets the occurrence rate $p(\tau^2|\xi)$ of the symmetrical reflection source $\tau^2$ to be higher as the reflection intensity of the reflection wave at the observation point $z^m$ is higher.

$$p(\tau^2|\xi)=\alpha_t \cdot \alpha_e \cdot P^{21} \qquad \text{[Expression 32]}$$

$$p(\tau^2|\xi)=\alpha_t \cdot \alpha_e \cdot P^{22} \qquad \text{[Expression 33]}$$

In the validity block 120, when the symmetrical reflection source $\tau^2$ is assumed, by the assumption block 110 at S110, on the front side of the outer periphery of the estimation state $\xi$ which is the side of the origin point O of the sensing device 3, similar to the case of the closest reflection source $\tau^1$, the occurrence rate $p(\tau^2|\xi)$ is set by Expression 32. On the other hand, in the validity block 120, when the symmetrical reflection source $\tau^2$ is assumed, by the assumption block 110 at S110, on the back side of the outer periphery of the estimation state $\xi$ which is the side opposite to the origin point O of the sensing device 3, similar to the case of the closest reflection source $\tau^1$, the occurrence rate $p(\tau^2|\xi)$ is set by Expression 33. Here, the random variable $P^{21}$ when setting the occurrence rate $p(\tau^2|\xi)$ on the front side is set to be a larger value than the random variable $P^{22}$ when setting the occurrence rate $p(\tau^2|\xi)$ on the back side, and the sum of the random variables in both cases is 1. That is, the validity block 120 sets the occurrence rate $p(\tau^2|\xi)$ in the case assumed on the front side higher than the occurrence rate $p(\tau^2|\xi)$ in the case assumed on the back side.

The validity block 120 sets the occurrence rate p $(\tau^3|\xi)$ of the internal reflection source $\tau^3$ by Expressions 34 and 35 when the internal reflection source $\tau^3$ is assumed by the assumption block 110 at S110 according to a case where the observation point $z^m$ is disposed within the outer periphery of the estimation state $\xi$. In Expression 35, the random variable $\alpha_e$ is set to the value used to set the closest reflection source $\tau^1$ and the symmetrical reflection source $\tau^2$.

$$p(\tau^3|\xi)=\alpha_t \cdot \alpha_{in} \qquad \text{[Expression 34]}$$

$$\alpha_{in}=1-\alpha_e \qquad \text{[Expression 35]}$$

The validity block 120 sets the assumption validity $p(z^m|\xi, \tau^0)$ of the clutter reflection source $\tau^0$ assumed by the assumption block 110 at S110 by Expression 36 representing a uniform distribution. V in Expression 36 is the volume of the evaluation region (i.e., validation region).

$$p(z^m \mid \tau^0, \xi) = \frac{1}{V} \qquad \text{[Expression 36]}$$

the validity block 120 sets the assumption validity $p(z^m|\xi, \xi^j)$ of the reflection source $\tau^j$ other than the clutter reflection source $\tau^0$ (i.e., the closest reflection source $\tau^1$, the symmetrical reflection source $\tau^2$, and the internal reflection source $\tau^3$) assumed by the assumption block 110 at S110 according to Expression 37 representing the Gaussian distribution. In Expression 37, R is the variance-covariance matrix that algebraically expresses the variance of the known observation noise according to Gaussian distribution. In Expression 37, h is a function for projecting the two-dimensional coordinates of the reflection source $\tau^j$ in the estimation state onto the observation space of the observation point $z^m$ to give three-dimensional information of the reflection source $\tau^j$, and is the observation equation expressed by Expression 38. Here, the three-dimensional information of the reflection source $\tau^j$ includes the distance r, the relative velocity dr, and the azimuth u, which have the same dimensions as the observation information $z^m$ in the observation space. In Expression 38, $r_\pi$ is a two-dimensional rotation matrix that gives a rotation with an angle of $\pi$ [rad] with respect to the distance r of the observation point $z^m$. In Expression 38, $r_\varphi$ is a two-dimensional rotation matrix that gives a rotation of the azimuth angle $\varphi$ [rad] with respect to the distance r of the observation point $z^m$. In Equation 38, $r_{\pi/2}$ is a two-dimensional rotation matrix that gives a rotation of an angle of $\pi/2$ [rad] with respect to the distance r of the observation point $z^m$. In expression 38, $u_0$ is given by Expression 19. In Expression 38, $\tau^j_y$ is the vertical component of the two-dimensional coordinates of the reflection source $\tau^j$.

$$p(z^m \mid \tau^j, \xi) = N(h(\tau^j, \xi), R) \qquad \text{[Expression 37]}$$

$$h(\tau^j, \xi) = \begin{bmatrix} \|\tau^j\| \\ \tau^{jT}\left(vr_\phi u_0 + \omega r_{\frac{\pi}{2}}(\tau^j - [x,y]^T)\right)/\|\tau^j\| \\ \tau^j_y \\ \|\tau^j\| \end{bmatrix} \qquad \text{[Expression 38]}$$

As shown in FIG. 3, at S130 of the tracking method, the update block 130 updates the estimation state $\xi$ at the specific time k. Specifically, the update block 130 acquires the posterior distribution $p(\xi|\{z\})$ by performing update processing on the prior distribution $p(\xi)$ regarding the estimation state $\xi$ at the specific time k. Here, the posterior distribution $p(\xi|\{z\})$ is expressed by Expression 39 based on the prior distribution $p(\xi)$ at the specific time k acquired by the estimation block 100 at S100 and the state validity $p(\{z\}|\xi)$ at the specific time k acquired by the validity block 120 at S120. Therefore, as shown in Expression 40, which illustrates the case where there are three observation points $z^m$ having $z^1$, $z^2$, and $z^3$, updating is performed for each observation point $z^m$, so that the posterior distribution $p(\xi|\{z\})$ is calculated with respect to all observation points $z^m$.

$$p(\xi \mid \{z\}) \propto p(\{z\} \mid \xi)p(\xi) = p(\xi)\prod p(z^m \mid \xi) \qquad \text{[Expression 39]}$$

$$p(\xi \mid \{z\}) \propto p(\xi)\prod p(z^m \mid \xi) = p(\xi)p(z^1 \mid \xi)p(z^2 \mid \xi)p(z^3 \mid \xi) \qquad \text{[Expression 40]}$$
$$\underset{UPDATE}{\underline{\qquad}}$$
$$\propto p(\xi \mid z^1)[(z^2 \mid \xi)p(z^3 \mid \xi)$$
$$\underset{UPDATE}{\underline{\qquad}}$$
$$\propto p(\xi \mid z^1, z^2)p(z^3 \mid \xi)$$
$$\underset{UPDATE}{\underline{\qquad}}$$
$$\propto p(\xi \mid z^1, z^2, z^3) = p(\xi \mid \{z\})$$

The update for each observation point $z^m$ is sequentially executed as in Expression 41 exemplifying the case where the observation point $z^m$ is $z^1$. Here, in Expression 41, the posterior distribution $p(\xi|\{z\})$ of the estimation state at the specific time k is extracted with respect to the distribution component of the observation point $z^m$ (i.e., $z^1$ in Expression 41) as a sequential update target. The second to fourth lines of Expression 41 are expressed by the Gaussian mixture model including: the state validity $p(\{z\}|\xi)$ based on the occurrence rate $p(\tau^j|\xi)$ and the assumption validity $p(z^m|\xi, \tau^j)$ for each reflection source $\tau^j$ represented by Expressions 28-38; and the prior distribution $p(\xi)$ relating to the estimation state $\xi$ at the specific time k. In the fifth line of Expression 41, the posterior distribution $p(\xi|\{z\})$ relating to such estimation state is updated by a filtering process using the EKF. For the filtering process with the EKF, Expressions 42-48 are introduced.

$$p(\xi)p(\xi) = p(\xi)\left(\frac{w^0}{V} + \sum_{j=1} w^j N(j(\tau^j, \xi), R)\right) = \qquad \text{[Expression 41]}$$

$$\left(\sum \lambda^i N(\xi \mid \overline{\xi}^i, M^i)\right)\left(w^0/V + \sum w^j N(h(\tau^j, \xi), R)\right) =$$

$$\frac{w^0}{V}\sum_i \lambda^i N(\xi \mid \overline{\xi}^i, M^i) +$$

$$\sum_i \sum_{j=1} \lambda^i w^j N(h(\tau^j, \xi), R)N(\xi \mid \overline{\xi}^i, M^i) \simeq$$

$$\frac{w^0}{V}\sum_i \lambda^i N(\xi \mid \overline{\xi}^i, M^i) + \sum_i \sum_j \lambda^i w_j \beta^{i,j} N(\xi^{i,j}, M^{i,j}) \xleftarrow{EKF}$$

$$\delta^{i,j} = z^1 - h(\tau^j_i, \overline{\xi}^i) \qquad \text{[Expression 42]}$$

$$S^{i,j} = R + H^{i,j} M^i H^{i,j^T} \qquad \text{[Expression 43]}$$

$$H^{i,j} = \frac{\partial h}{\partial \xi}\Big|_{\tau^j_i, \overline{\xi}^i} \qquad \text{[Expression 44]}$$

$$K^{i,j} = M^i H^{i,j^T} S^{i,h^{-1}} \qquad \text{[Expression 45]}$$

$$\beta^{i,j} = \frac{1}{(2\pi)^{\frac{3}{2}}|S^{i,j}|^{\frac{1}{2}}}\exp\left(-\frac{1}{2}\delta^{i,j^T} S^{i,j^{-1}} \delta^{i,j}\right) \qquad \text{[Expression 46]}$$

$$\overline{\xi}^{i,j} = \overline{\xi}^i + K^{i,j}\delta^{i,j} \qquad \text{[Expression 47]}$$

$$M^{i,j} = M^i - K^{i,j} S^{i,j} K^{i,j^T} \qquad \text{[Expression 48]}$$

In particular, Expression 42 expresses a difference operation between the three-dimensional information of the reflection source $\tau^j$ projected onto the observation space in the estimation state $\xi$ at the specific time k and the observation information $z^m$ in the observation space. In view of the above features, the update of the posterior distribution $p(\xi|\{z\})$ regarding the estimation state is executed based on the state validity $p(\{z\}|\xi)$ expressed including the difference $\delta^{i,j}$ between the three-dimensional information of the reflection source $\tau^j$ in the observation space and the observation information $z^m$. Note that the index i defined by Expression 9 is also used in Expressions 41 to 48 to identify sampling points. Also, in the fifth line of Expression 41 and Expressions 42 and 44, $w^j$ and $\tau^j$ are rewritten as $w_i^j$ and $\tau_i^j$ based on the knowledge that $w^j$ and $\tau^j$ depend on the average of $\xi^i$ according to Expression 12, respectively.

In the update for each observation point $z^m$, the update block 130 in S130 merges the number of Gaussian distributions constituting the Gaussian mixture model of the posterior distribution $p(\xi|\{z\})$ below the assumption number J of the reflection source $\tau^j$. Here, the merging is performed by combining similar Gaussian distributions into one of them, for example. As described above, the update for each observation point $z^m$ is completed as shown in Expression 49 exemplifying the case where the observation point $z^m$ is $z^1$.

$$P(\xi \mid z^1) \simeq \sum_i \lambda^{1,i} N(\bar{\xi}^{1,i}, M^{1,i}) \qquad \text{[Expression 49]}$$

Thus, in this embodiment, the estimation block 100 corresponds to the "estimation unit", the assumption block 110 corresponds to the "assumption unit", the validity block 120 corresponds to the "validity unit", and the update block 130 corresponds to the "update unit". In the present embodiment, S100 corresponds to the "estimation process", S110 corresponds to the "assumption process", S120 corresponds to the "validity process", and S130 corresponds to the "update process".

Operation Effects

The functions and effects in the present embodiment described above will be explained below.

According to these embodiments, a plurality of reflection sources $\tau^j$ of the reflection wave that give the observation point $z^m$ observed at the specific time k are assumed for the estimation state $\xi$ of the target object 2 at the specific time k. Therefore, the estimation state $\xi$ is updated based on the state validity $p(\{z\}|\xi)$ expressed including the difference $\delta^{i,j}$ between the dimensional information of the reflection source $\tau^j$ projected onto the observation space in the estimation state $\xi$ and the observation information $z^m$ in the observation space, as the state validity $p(\{z\}|\xi)$, which is the validity of the estimation state $\xi$.

In this embodiment, the dimensional information of the reflection source $\tau^j$ including the relative velocity dr of the target object 2 in the observation space is compared with the observation information $z^m$ of the same dimension as the difference therebetween, so that the estimation state is updated using the state validity $p(\{z\}|\xi)$ with high accuracy reflecting the difference comparison result. Therefore, it is possible to achieve both securing the tracking accuracy and reducing the calculation load.

According to these embodiments, a plurality of reflection sources $\tau^j$ of the reflection wave that give the observation point $z^m$ observed at the specific time k are assumed for the estimation state $\xi$ of the target object 2 at the specific time k. Therefore, the state validity $p(\{z\}|\xi)$, which is the validity of the estimation state is acquired based on the occurrence rate $p(\tau^j|\xi)$ for each reflection source $\tau^j$ in the estimation state $\xi$ and the assumption validity $p(z^m|\xi, \tau^j)$, which is the validity for each reflection source $\tau^j$ in the estimation state $\xi$, so that the estimation state $\xi$ at the specific time k is updated using the state validity $p(\{z\}|\xi)$.

Thus, in the present embodiment, the occurrence rate $p(\tau^j|\xi)$ and the assumption validity $p(z^m|\xi, \tau^j)$ for each of the multiple assumed reflection sources $\tau^j$ are reflected, so that the state validity $p(\{z\}|\xi)$ can be acquired accurately. Therefore, by updating the estimation state $\xi$ using the accurate state validity $p(\{z\}|\xi)$, it is possible to ensure the tracking accuracy. Moreover, since all of the reflection source assumption, validity acquisition, and state update are processes related to a specific time k, it is possible to reduce the calculation load while ensuring the tracking accuracy.

According to this embodiment, the occurrence rate $p(\tau^0|\xi)$ of the clutter reflection source $\tau^0$ assumed to be the reflection source $\tau^j$ due to clutter is set lower as the reflection intensity of the reflection wave at the observation point $z^m$ is higher. Thus, since the occurrence rate $p(\tau^0|\xi)$, which can be the degree of reflection of the clutter reflection source $\tau^0$ in the acquisition of the state validity $p(\{z\}|\xi)$, can be appropriately set according to the reflection intensity, it is possible to improve the tracking accuracy by updating the estimation state $\xi$ based on the state validity $p(\{z\}|\xi)$.

According to this embodiment, the occurrence rate $p(\tau^1|\xi)$ of the closest reflection source assumed to be the reflection source $\tau^j$ at the closest position on the outer periphery of the estimation state $\xi$ is set to be higher as the reflection intensity of the reflection wave at the observation point $z^m$ is higher. According to this, the occurrence rate $p(\tau^1|\xi)$, which can be the degree of reflection of the closest reflection source $\tau^1$ in the acquisition of the state validity $p(\{z\}|\xi)$, can be appropriately set according to the reflection intensity. Thus, it is possible to ensure high tracking accuracy by updating the estimation state $\xi$ based on the state validity $p(\{z\}|\xi)$.

According to the present embodiment, the occurrence rate $p(\tau^1|\xi)$ of the closest reflection source $\tau^1$ in the case where it is assumed to be disposed on the sensing device 3 side of the outer periphery of the estimation state $\xi$ is set to be higher than the occurrence rate $p(\tau^1|\xi)$ of the closest reflection source in the case where it is assumed to be disposed on the side opposite to the sensing device 3 of the outer periphery of the estimation state $\xi$. According to this, in the acquisition of the state validity $p(\{z\}|\xi)$, the occurrence rate $p(\tau^1|\xi)$, which can be the degree of reflection of the closest reflection source $\tau^1$, is set according to the positional relationship between the sensing device 3 and the closest reflection source $\tau^1$ of the target object 2. Thus, it is possible to ensure high tracking accuracy by updating the estimation state $\xi$ based on the state validity $p(\{z\}|\xi)$.

According to this embodiment, the symmetrical reflection source $\tau^2$, which is assumed to be disposed at a position symmetrical to the closest position of the closest reflection source $\tau^1$ on the outer periphery of the estimation state $\xi$, is assumed as one of the multiple reflection sources $\tau^j$. According to this, it is possible to prevent the estimation state $\xi$ to be updated based on the state validity $p(\{z\}|\xi)$ considering the multiple reflection sources $\tau^j$ from being erroneously stuck to the closest position. Moreover, according to the present embodiment, the higher the reflection intensity of the reflection wave at the observation point $z^m$, the higher the occurrence rate $p(\tau^2|\xi)$ of the symmetric reflection source $\tau^2$ is set. According to this, the occurrence rate $p(\tau^2|\xi)$, which can be the degree of reflection of the symmetrical reflection source $\tau^2$ in the acquisition of the state validity $p(\{z\}|\xi)$, can be appropriately set according to the reflection intensity. Thus, together with suppression of sticking to the closest position, it is possible to improve tracking accuracy by updating the estimation state $\xi$ based on the state validity $p(\{z\}|\xi)$.

According to the present embodiment, the occurrence rate $p(\tau^2|\xi)$ of the symmetrical reflection source $\tau^2$ in the case where it is assumed to be disposed on the sensing device 3 side of the outer periphery of the estimation state is set to be higher than the occurrence rate $p(\tau^2|\xi)$ of the symmetrical reflection source $\tau^2$ in the case where it is assumed to be disposed on the side opposite to the sensing device 3 of the outer periphery of the estimation state According to this, in the acquisition of the state validity $p(\{z\}|\xi)$, the occurrence rate $p(\tau^2|\xi)$, which can be the degree of reflection of the symmetrical reflection source $\tau^2$, is set according to the positional relationship between the sensing device 3 and the symmetrical reflection source $\tau^2$ of the target object 2. Thus, it is possible to ensure high tracking accuracy by updating the estimation state $\xi$ based on the state validity $p(\{z\}|\xi)$.

According to this embodiment, when the observation point $z^m$ exists within the outer periphery of the estimation state $\xi$, the internal reflection source $\tau^3$ assumed within the outer periphery is assumed to be one of the multiple reflection sources $\tau^j$. According to this, the update of the estimation state $\xi$ based on the state validity $p(\{z\}|\xi)$ considering multiple reflection sources $\tau^j$ can be a precise update that takes into account the assumption of the reflection inside the target object 2. Therefore, it becomes possible to improve the tracking accuracy.

According to this embodiment, using the Gaussian mixture model based on the estimation state updated at the past time k−1 with respect to the specific time k, the prior distribution $p(\xi)$ for the estimation state at the specific time k is acquired. Thus, it is possible to reduce the calculation load in the acquisition processing. Furthermore, according to this embodiment, the posterior distribution $p(\xi|\{z\})$ with respect to the estimation state $\xi$ at the specific time k, which is represented by the Gaussian mixture model including the state validity $p(\{z\}|\xi)$ and the prior distribution $p(\xi)$, is updated by the extended Kalman filter, so that it is possible to reduce the calculation load in the updating process.

According to this embodiment, the number of distributions of the assumption validity $p(z^m|\xi, \tau^j)$ that constitutes the Gaussian mixture model of the posterior distribution $p(\xi|\{z\})$ is merged below the assumption number J of the reflection source $\tau^j$. Therefore, it is possible to reduce the calculation load in the acquisition process of the state validity $p(\{z\}|\xi)$ and the update process of the estimation state based on the state validity $p(\{z\}|\xi)$.

In this embodiment, the sensing device 3 is a radar whose reflection waves are millimeter waves. Therefore, the present embodiment is particularly effective for observation of the surroundings of, for example, the autonomous driving vehicle 4 or the advanced driving support vehicle 4 equipped with such a millimeter wave radar.

Other Embodiments

Although one embodiment has been described, the present disclosure should not be limited to the above embodiment and may be applied to various other embodiments within the scope of the present disclosure.

The tracking device 1 of the modification may be a special purpose computer configured to include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

The tracking device, the tracking method, and the tracking program according to modifications may be applied to objects other than vehicles. In this case, the tracking device that is applied to anything other than the vehicle may not be mounted or installed on the same object as the sensing device 3. In a modification, S120 by the validity block 120 and S130 by the update block 130 may be performed by the same step in the same block.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A tracking device for tracking a target object based on dimensional information of an observation space including a relative velocity of the target object with respect to a sensing device as observation information of the sensing device for observing a reflection wave from the target object, the tracking device comprising:

at least one processor with a memory storing computer program code, wherein:

the at least one processor with the memory is configured to cause the tracking device to execute:

acquiring an estimation state by estimating a state of the target object at a specific time;

identifying—therefor, based on the estimation state, a candidate reflection source of the reflection wave that gives an observation point observed at the specific time;

acquiring a state validity, which is a validity of the estimation state; and updating the estimation state based on the state validity expressed including a difference between dimensional information of the candidate reflection source projected onto the observation space in the estimation state and the observation information, wherein:

the acquiring of the estimation state includes acquiring a prior distribution for the estimation state at the specific time by a Gaussian mixture model based on the estimation state updated at a past time with respect to the specific time; and the updating of the estimation state includes updating a posterior distribution, for the estimation state at the specific time represented by a Gaussian mixture model including the state validity and the prior distribution, using an extended Kalman filter.

2. A tracking device for tracking a target object based on observation information from a sensing device that observes a reflection wave from the target object, the tracking device comprising:

at least one processor with a memory storing computer program code, wherein:

the at least one processor with the memory is configured to cause the tracking device to execute:

acquiring an estimation state by estimating a state of the target object at a specific time;

identifying—therefor, based on the estimation state, a plurality of candidate reflection sources of the reflection wave that gives an observation point observed at the specific time;

acquiring a state validity, which is a validity of the estimation state, based on an occurrence rate of each of the plurality of candidate reflection sources in the estimation state and an assumption validity, which is a validity of each of the plurality of candidate reflection sources in the estimation state; and updating the estimation state based on the state validity, wherein:

the acquiring of the estimation state includes acquiring a prior distribution for the estimation state at the specific time by a Gaussian mixture model based on the estimation state updated at a past time with respect to the specific time; and the updating of the estimation state includes updating a posterior distribution, for the estimation state at the specific time represented by a Gaussian mixture model including the state validity and the prior distribution, using an extended Kalman filter.

3. The tracking device according to claim 2, wherein:

the identifying of the plurality of candidate reflection sources of the reflection wave includes identifying a clutter reflection source, which is identified to be one of the plurality of candidate reflection sources due to clutter; and the acquiring of the state validity includes setting the occurrence rate of the clutter reflection source to be lower as a reflection intensity of the reflection wave at the observation point is higher.

4. The tracking device according to claim 2, wherein:

the identifying of the plurality of candidate reflection sources of the reflection wave includes identifying a closest reflection source, which is identified to be one of the plurality of candidate reflection sources at a closest position on an outer periphery of the estimation state; and the acquiring of the state validity includes setting the occurrence rate of the closest reflection source to be higher as a reflection intensity of the reflection wave at the observation point is higher.

5. The tracking device according to claim 4, wherein:

the acquiring of the state validity includes setting the occurrence rate of the closest reflection source in a case where the closest reflection source is identified to be disposed on a sensing device side of the outer periphery to be higher than the occurrence rate of the closest reflection source in a case where the closest reflection source is identified to be disposed on a side opposite to the sensing device of the outer periphery.

6. The tracking device according to claim 4, wherein:

the identifying of the plurality of candidate reflection sources of the reflection wave includes identifying a symmetrical reflection source identified to be one of the plurality of candidate reflection sources at a position symmetrical to the closest position on the outer periphery; and the acquiring of the state validity includes setting the occurrence rate of the symmetrical reflection source to be higher as a reflection intensity of the reflection wave at the observation point is higher.

7. The tracking device according to claim 6, wherein:

the acquiring of the state validity includes setting the occurrence rate of the symmetrical reflection source in a case where the symmetrical reflection source is identified to be disposed on a sensing device side of the outer periphery to be higher than the occurrence rate of the symmetrical reflection source in a case where the symmetrical reflection source is identified to be disposed on a side opposite to the sensing device of the outer periphery.

8. The tracking device according to claim 2, wherein:

the identifying of the plurality of candidate reflection sources of the reflection wave includes identifying an internal reflection source identified to be one of the candidate reflection sources within the outer periphery when the observation point is disposed within the outer periphery of the estimation state.

9. The tracking device according to claim 2, wherein:

the acquiring of the state validity includes merging a numerical number of Gaussian distributions constituting the Gaussian mixture model of the posterior distribution below a number of the plurality of candidate reflection sources.

10. The tracking device according to claim 2, wherein:

the sensing device is a radar whose reflection wave is a millimeter wave.

11. A tracking method executed by a processor for tracking a target object based on dimensional information of an observation space including a relative velocity of the target object with respect to a sensing device as observation information of the sensing device that observes a reflection wave from the target object, the tracking method comprising:

an estimation step for acquiring an estimation state by estimating a state of the target object at a specific time;

an assumption step for identifying, based on the estimation state, a candidate reflection source of the reflection wave that gives an observation point observed at the specific time;

a validity step for acquiring a state validity that is a validity of the estimation state; and an update step for updating the estimation state based on the state validity expressed including a difference between dimensional information of the candidate reflection source projected onto the observation space in the estimation state and the observation information, wherein:

the estimation step further includes: acquiring a prior distribution for the estimation state at the specific time by a Gaussian mixture model based on the estimation state updated at a past time with respect to the specific time; and the update step further includes: updating a posterior distribution, for the estimation state at the specific time represented by a Gaussian mixture model including the state validity and the prior distribution, using an extended Kalman filter.

12. A tracking method executed by a processor for tracking a target object based on observation information from a sensing device that observes a reflection wave from the target object, the tracking method comprising:

an estimation step for acquiring an estimation state by estimating a state of the target object at a specific time;

an assumption step for identifying, based on the estimation state, a plurality of candidate reflection sources of the reflection wave that gives an observation point observed at the specific time;

a validity step for acquiring a state validity, which is a validity of the estimation state, based on an occurrence rate of each of the plurality of candidate reflection sources in the estimation state and an assumption validity, which is a validity of each of the plurality of candidate reflection sources in the estimation state; and an update step for updating the estimation state based on the state validity, wherein:

the estimation step further includes: acquiring a prior distribution for the estimation state at the specific time by a Gaussian mixture model based on the estimation state updated at a past time with respect to the specific time; and the update step further includes: updating a posterior distribution, for the estimation state at the specific time represented by a Gaussian mixture model including the state validity and the prior distribution, using an extended Kalman filter.

13. A non-transitory tangible computer readable storage medium comprising instructions for causing a processor to execute tracking a target object based on information in an observation space including a relative velocity of the target object with respect to a sensing device as observation information of the sensing device that observes a reflection wave from the target object, wherein:

the instructions include:

an estimation step for acquiring an estimation state by estimating a state of the target object at a specific time;

an assumption step for identifying, based on the estimation state, a candidate reflection source of the reflection wave that gives an observation point observed at the specific time;

a validity step for acquiring a state validity that is a validity of the estimation state; and an update step for updating the estimation state based on the state validity expressed including a difference between dimensional information of the candidate reflection source projected onto the observation space in the estimation state and the observation information;

the estimation step further includes: acquiring a prior distribution for the estimation state at the specific time by a Gaussian mixture model based on the estimation state updated at a past time with respect to the specific time; and the update step further includes: updating a posterior distribution, for the estimation state at the specific time represented by a Gaussian mixture model including the state validity and the prior distribution, using an extended Kalman filter.

14. A non-transitory tangible computer readable storage medium comprising instructions for causing a processor to execute tracking a target object based on observation information of a sensing device that observes a reflection wave from the target object, wherein:

the instructions include:

an estimation step for acquiring an estimation state by estimating a state of the target object at a specific time;

an assumption step for identifying, based on the estimation state, a plurality of candidate reflection sources of the reflection wave that gives an observation point observed at the specific time;

a validity step for acquiring a state validity, which is a validity of the estimation state, based on an occurrence rate of each of the plurality of candidate reflection sources in the estimation state and an assumption validity, which is a validity of each of the plurality of candidate reflection sources in the estimation state; and an update step for updating the estimation state based on the state validity;

the estimation step further includes: acquiring a prior distribution for the estimation state at the specific time by a Gaussian mixture model based on the estimation state updated at a past time with respect to the specific time; and the update step further includes: updating a posterior distribution, for the estimation state at the specific time represented by a Gaussian mixture model including the state validity and the prior distribution, using an extended Kalman filter.

* * * * *